United States Patent
Tsou et al.

(10) Patent No.: US 6,966,999 B2
(45) Date of Patent: Nov. 22, 2005

(54) ORIENTED THERMOPLASTIC VULCANIZATE

(75) Inventors: Andy H. Tsou, Houston, TX (US); Ilan Duvdevani, Houston, TX (US); Hsien-Chang Wang, Bellaire, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 169 days.

(21) Appl. No.: 10/344,460

(22) PCT Filed: Jul. 2, 2001

(86) PCT No.: PCT/US01/20942

§ 371 (c)(1),
(2), (4) Date: Jul. 3, 2003

(87) PCT Pub. No.: WO02/14410

PCT Pub. Date: Feb. 21, 2002

(65) Prior Publication Data

US 2004/0024126 A1 Feb. 5, 2004

Related U.S. Application Data

(60) Provisional application No. 60/225,479, filed on Aug. 15, 2000.

(51) Int. Cl.[7] .......................... B29C 55/00; B29C 71/00
(52) U.S. Cl. ................... 264/291; 264/234; 264/235.8; 264/237; 264/346; 525/178
(58) Field of Search ......................... 264/234, 235.8, 264/237, 291, 346; 525/178

(56) References Cited

U.S. PATENT DOCUMENTS

| | | | |
|---|---|---|---|
| 5,238,990 A | 8/1993 | Yu et al. | 524/504 |
| 5,244,961 A | 9/1993 | Yu et al. | 524/514 |
| 5,616,420 A | 4/1997 | Yamaoka et al. | 428/515 |
| 5,851,323 A | 12/1998 | Kaido et al. | 152/510 |
| 5,910,544 A | 6/1999 | Ozawa et al. | 525/178 |
| 5,938,869 A | 8/1999 | Kaido et al. | 152/510 |
| 6,136,123 A | 10/2000 | Kaido et al. | 156/123 |

FOREIGN PATENT DOCUMENTS

| | | | | |
|---|---|---|---|---|
| EP | 0 857 761 A1 | 8/1998 | | C08L 101/00 |
| EP | 0 922 732 A2 | 6/1999 | | C08L 77/00 |
| EP | 0 969 039 A1 | 1/2000 | | C08L 19/00 |
| JP | 1993051525 A | 3/1993 | | C08L 77/00 |
| JP | 1994040207 A | 2/1994 | | B60C 5/14 |
| JP | 1995032468 A | 2/1995 | | B29C 55/02 |

OTHER PUBLICATIONS

Patent Abstract of Japan, JP 05051525, Published Mar. 2, 1993, "Polyamide Resin Composition and its Stretched Film" (Mitsubishi Kasei Polytec Co.).

*Primary Examiner*—Ana Woodward
(74) *Attorney, Agent, or Firm*—Kevin M. Faulkner; Leandro Arechederra

(57) ABSTRACT

Oriented films are prepared. A thermoplastic vulcanizate, prepared by mixing at least 20 wt % of a thermoset rubber by weight of the total composition into a thermoplastic polymer are disclosed. After the mixture is prepared the thermoset rubber is entrained as discrete particles within the continuous thermoplastic polymer phase. The resulting composite is subjected to a stress either by pulling, blow molding, or any other film-forming process as is known in the art. This stress causes the continuous phase polymer molecules to become aligned or oriented in the direction in which the stress was applied, thus creating the oriented thermoplastic vulcanizate of the invention. This material has improved gas permeability and improved flexibility properties.

16 Claims, No Drawings

ORIENTED THERMOPLASTIC VULCANIZATE

CROSS REFERENCE TO RELATED APPLICATIONS

This application claims the benefit of Provisional Application No. 60/225,479, filed Aug. 15, 2000, herein incorporated by reference in its entirety.

FIELD OF THE INVENTION

This invention relates to thermoplastic vulcanizate films having improved properties and to a method of preparing the same. More particularly, the invitation relates to thermoplastic vulcanizate films having improved properties with regard to mechanical strength, flex resistance and low permeability.

BACKGROUND

Materials that have low gas permeability coupled with high flexibility have numerous uses in industry. Automotive rubbers such as tires and hoses benefit from such materials because they decrease weight, while many non-automotive uses benefit from low gas permeability irrespective of weight improvement.

One of the main improvements sought by automobile companies is reduced fuel consumption. One way to accomplish this is to reduce vehicle weight, which translates into reducing the weight of vehicle components, i.e. using less material. For example, pneumatic tires contain an inner liner that seals air inside the tire. The inner liner is usually made out of butyl or halogenated butyl rubber. To use this material, the tire manufacturer must sandwich and additional rubber layer with low hysteresis loss between the inner liner and the tire itself. As a result using butyl rubber as an inner liner results in a weight penalty from the inner liner and from the additional layer. Therefore, an appropriate butyl rubber replacement for tire inner liners potentially provides a two-faceted weight improvement. First, the additional rubber layer may be dispensed with. Second, to the extent that the substitute inner liner weighs less than the butyl-based inner liner further weight reduction is achieved, as when the replacement liners have a gas permeability that is lower than butyl liners. Lower gas permeability allows similar gas containment while using a thinner liner thereby reducing weight. Similarly, lower permeability materials result in weight savings for hoses as well. Additionally, when more gas tight hoses are used on closed systems, both automotive and non-automotive, the systems require less maintenance. This is especially important for refrigeration systems, such as air conditioners, that contain ozone-layer-destroying gases. Material with low gas permeability benefits a variety of uses.

Usually, materials with lower gas permeability do not have sufficient flexibility to reliably adhere to tire carcasses or rubber hoses. Plastics usually have lower gas permeability than rubbers, but much less flexibility. This stiffness causes the plastic liner to be unable to track the underlying substrate's expansion and contraction due to temperature changes resulting in a failure of the substrate-liner bond or the liner itself. EP 0 857 761 A1 discusses a variety of attempts at using plastic-base materials as tire inner liners. U.S. Pat. No. 5,910,544 discusses the problem for rubber hoses, as well. The unifying factor in the prior art solutions is the use of a low-permeability resin or thermoplastic. For instance, instead of using a butyl liner for a tire, JP06040207 (filed Jul. 24, 1992) discloses a film comprising polyvinylidene chloride.

The disclosures in EP 0 857 761 A1 and U.S. Pat. No. 5,910,544 outline partial solutions to the problem. These disclosures teach a thermoplastic vulcanizate that satisfies low-permeability demands, by using traditional thermoplastics, and that satisfies durability-driven flexibility demands, by using entrained thermoset rubbers. But improvements in permeability/flexibility parameters have not been exhausted. Lower-permeability-higher-flexibility materials are still needed.

SUMMARY OF THE INVENTION

The present invention provides an improved thermoplastic vulcanizate film in which a thermoplastic component is preferentially oriented within the plane of the film. Anisotropy caused by alignment of the thermoplastic polymer molecules results in higher mechanical strength, lower gas permeability and increased flexibility for the bulk film. The oriented thermoplastic vulcanizate film is prepared by heating the thermoplastic vulcanizate, stretching it in at least one direction parallel to the plane of the film, heatsetting the thermoplastic polymer to freeze or lock it in its anisotropic arrangement, and cooling it after processing.

DETAILED DESCRIPTION

The oriented thermoplastic vulcanizate film of this invention comprises a thermoplastic vulcanizate treated to lock the orientation of thermoplastic polymer molecules into the film. The polymer molecules are preferentially aligned in at least one direction. Therefore, the overall polymer orientation is not equal in all directions the arrangement is anisotropic. Once film processing is complete, neither ambient thermal energy nor bulk molecular displacement can substantially alter polymer alignment the molecules are locked in place. The invention's starting point is thermoplastic vulcanizate materials themselves. These types of materials have two main components or phases: a discrete phase and a continuous phase. They combine the discrete- and continuous-phase properties, and, in this invention, allow the preparation of materials that combine low gas and moisture permeability, with high flexibility and good elongation at break.

Typically, the continuous phase is a thermoplastic polymer. (Component A—also referred to as a thermoplastic resin). This continuous phase serves as a matrix to support the entrained discrete phase. The term "thermoplastic polymer" encompasses a variety of polymeric materials, which have as a common feature the ability to melt and to return to a solid with substantially the same pre-melt properties thermoplastic polymers are remeltable. Additionally, they have low gas permeability compared to butyl or halo butyl rubber. Under the broadest scope of this invention, any thermoplastic polymer that is both chemically compatible and processible with the selected discrete phase or phases is useful in this invention's practice.

More specifically, component A is any polymer, polymer mixture, copolymer, or copolymer mixture consistent with the processing needs of the discrete phase. Examples of component A include, but are not necessarily limited to, those discussed and listed below. In one embodiment, the thermoplastic polymer is a polyamide.

In another embodiment, component A is a polyamide thermoplastic resin or resin mixture. Examples of polyamide thermoplastic resins are, more specifically, a nylon 6 and nylon 66 copolymer (N6/N66), a nylon 6 and nylon 10 alternating copolymer (nylon 610: N610), a nylon 6 and nylon 12 alternating copolymer (nylon 612: N612), and other various types of polyamide thermoplastic resins, their mixtures, and further polyamide thermoplastic resin compositions having these as main components may be preferably illustrated. Nylons are a common polyamide, and their nomenclature and properties are well known, such as disclosed in POLYMER TECHNOLOGY DICTIONARY 274–279 (Chapman & Hall 1994), and in HANDBOOK OF PLASTICS, ELASTOMERS AND COMPOSITES 1.58–1.62 (Charles A. Harper, ed., McGraw-Hill 1992).

Other examples of component A are MXD6, nylon 6T, nylon 6/6T copolymer, nylon 66/PP copolymer, nylon 66/PPS copolymer), polyester resins (for example, polybutylene terephthalate (PBT), polyethylene terephthalate (PET), polyethylene isophthalate (PEI), polybutylene terephthalate/tetramethylene glycol copolymer, PET/PEI copolymer, polyacrylate (PAR), polybutylenenaphthalate (PBN), liquid crystal polyester, polyoxyalkylene diimidodiacid/polybutylene terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(methyl)acrylate resins (for example, polymethyl methacrylate (PMMA), polyethyl methacrylate), polyvinyl resins (for example, vinyl acetate, polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methylacrylate copolymer), cellulose resins (for example, cellulose acetate and cellulose acetate butyrate), fluoro resins (for example, polyvinylidene fluoride (PVDF), polyvinyl fluoride (PVF), polychlorofluoroethylene (PCTFE), tetrafluoroethylene/ethylene copolymer (ETFE)), imide resins (for example, aromatic polyimide (PI)), etc. may be mentioned.

Furthermore, blends of these polyamide thermoplastic resins may also be used. Specifically, as a two-component system blend, a nylon 6 and nylon 66 blend (N6/N66), a nylon 6 and nylon 11 blend (N6/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 12 blend (N11/N12), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612), etc. may be mentioned. Further a similar three-component system blend, four-component system blend, five-component system blend, and other various types of polyamide thermoplastic resins and polyamide thermoplastic resin compositions including these as main components may be suitably mentioned.

Note that the composition of the blend may be suitably selected according to the application thereof, etc.

Among these, in particular, nylon 6 (N6), nylon 66 (N66), a nylon 6 and nylon 66 copolymer (N6/N66), a nylon 6 and nylon 10 alternating copolymer (nylon 610: N610), a nylon 6 and nylon 12 alternating copolymer (nylon 612: N612), a nylon 6 and nylon 66 blend (N6/N66), a nylon 6 and nylon 11 blend (N1/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612) a nylon 6, nylon 11 and nylon 610 blend (N6/N11/N610), a nylon 6, nylon 11, and nylon 612 blend (N6/N11/N612), a nylon 6, nylon 12, and nylon 610 blend (N6/N12/N610), a nylon 6, nylon 12 and nylon 612 blend (N6/N12/N612), a nylon 6, nylon 610 and nylon 612 blend (N6/N610/N612), a nylon 66, nylon 11 and nylon 610 blend (N66/N11/N610), a nylon 66, nylon 11 and nylon 612 blend (N66/N11/N612), a nylon 66, nylon 12 and nylon 610 blend (N66/N12/N610), a nylon 66, nylon 12 and nylon 612 blend (N66/N12/N612), a nylon 66, nylon 610 and nylon 612 blend (N66/N610/N612), a nylon 6, nylon 66, nylon 11 and nylon 610 blend (N6/N66/N11/N610), a nylon 6, nylon 66, nylon 11 and nylon 612 blend (N6/N66/N11/N612), a nylon 6, nylon 66, nylon 12 and nylon 610 blend (N6/N66/N12/N610), a nylon 6, nylon 66, nylon 12 and nylon 612 blend (N6/N66/N12/N612), a nylon 6, nylon 66, nylon 610 and nylon 612 blend (N6/N66/N610/N612), a nylon 6 nylon 11, nylon 12 and nylon 610 blend (N6/N11/N12/N610), a nylon 6, nylon 11, nylon 12 and nylon 610 blend (N6/N11/N12/N612), a nylon 6, nylon 11, nylon 610, nylon 612 blend (N6/N11/N610/N612), a nylon 6, nylon 12, nylon 610 and nylon 612 blend (N6/N12/N610/N612), a nylon 6, nylon 66, nylon 11, nylon 610 and nylon 612 blend (N6/N66/N11/N610/N612), a nylon 6, nylon 66, nylon 12, nylon 610 and nylon 612 blend (N6/N66/N12/N610/N612), a nylon 6, nylon 66, nylon 11, nylon 12, nylon 610 and nylon 612 blend (N6/N66/N11/N12/N610/N612), etc., may be suitably mentioned.

The thermoplastic resin component may contain an antioxidant, agent for preventing deterioration due to heat, stabilizer, processing aid, pigment, dye, etc.

The materials of this invention also contain a discrete phase. (Component B—also referred to as a rubber component or a vulcanizate). Typically, the discrete phase is a rubber, copolymer rubber, or elastomer, and is a thermoset polymer. This means that upon melting or heating the polymer permanently sets. Once heated and cooled, a thermoset polymer has substantially different properties than before melting; it is not remeltable. The polymer sets by crosslinking; that is, the polymer molecules connect to each other. Vulcanization is one form of crosslinking, hence the term vulcanizate. Crosslinking gives component B the characteristics desired for this invention: high flexibility and good moisture impermeability. Under the broadest scope of this invention, any rubber, copolymer rubber, elastomer, or mixtures of these, that is compatible with the thermoplastic resin of component A, is useful in the practice of this invention. Component B should be crosslinked or crosslinkable. Examples of component B that are useful in the practice of this invention include, but are not necessarily limited to those listed below.

Diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM, EPM), maleic acid-modified ethylene-propylene rubber (M-EPM)), butyl rubber (IIR), isobutylene and aromatic vinyl or diene monomer copolymers, acryl rubber (ACM), ionomers), halogen-containing rubbers (for example, Br-IIR, CI-IIR, a bromide of isobutylene-p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), silicone rubber (for example, methylvinyl silicone rubber, dimethyl silicone rubber, methylphenylvinyl silicone rubber), sulfur-containing rubbers (for example, polysulfide rubber), fluororubbers (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned.

A preferred component B is poly(isobutylene-co-paramethylstyrene) ("IPMS"). The IPMS used in the present invention is a block or random copolymer of the above two or three repeating units. Also, see U.S. Pat. No. 5,162,445, which is fully incorporated by reference, for other materials useful as Component B.

In the above IPMS, as the p-alkylstyrene, a p-alkylstyrene having a $C_1$ to $C_5$ primary alkyl group and a p-alkylstyrene where this alkyl group is halogenated may be mentioned, for example, p-methylstyrene, p-ethylstyrene, and their halides may be mentioned.

The content of the p-alkylstyrene in the IPMS is preferably 5.5 to 25 wt %, more preferably 6 to 20 wt % by weight of the total IPMS polymer.

By making the content of the p-alkylstyrene in the IPMS at least 5.5 wt %, it is possible to introduce sufficient halogen into the IPMS, whereby sufficient cross-linking is possible. By making the content of the p-alkylstyrene not more than 25 wt %, it is possible to reliably prevent the molecules from becoming rigid and to obtain a shaped article having sufficient rubber elasticity. That is, by making the content of the p-alkylstyrene in the IPMS the above range, it is possible to obtain desirable results in that it is possible to obtain sufficient cross-linking and to realize a processed shaped article having superior rubber elasticity.

On the other hand, as the $C_4$ to $C_7$ isomonoolefin, isobutylene, isopentene, etc. may be mentioned. In particular, isobutylene is preferably mentioned.

Further, the halogen content of the IPMS is not particularly limited, but at least 1 wt % is preferred, particularly 1 to 5 wt % is preferred by weight of the total IPMS polymer.

Note that the halogen atom may be bromine, iodine, chlorine, or any other so-called halogen, but bromine is particularly preferred.

As the IPMS, those having a Mooney viscosity ($ML_{1+8}$ at 100° C.) of at least 20, more preferably 30 to 70, are preferably used.

Using an IPMS with a Mooney viscosity in the above range is preferable in the point of the dispersion with respect to the aforementioned polyamide thermoplastic resin.

Such an IPMS may be obtained, for example, as shown in the following formula (3), by partially halogenating, for example, partially brominating by $Br_2$, a copolymer of isobutylene and p-methylstyrene. This IPMS is commercially sold by ExxonMobil Chemical Company (Houston, Tex.) under the trade name EXXPRO™ and is suitably used. Further, the brominated or other halogenated p-alkylstyrene may be copolymerized. This IPMS may be used alone or as a mixture of two or more grades.

The thermoplastic vulcanizate comprises component B dispersed in component A and therefore, the blend combines A and B's properties. Particular properties depend upon the B-to-A ratio. At low B ratios, the materials are substantially plastic like. While remaining plastic, incorporating component-B rubber frequently causes the material to be tougher: a toughened plastic. Such materials are not thermoplastic vulcanizates. But as B ratios increase, the material takes on more rubber-like properties, and a thermoplastic vulcanizate is formed. To form a thermoplastic vulcanizate, the minimum ratio of B to A is 20 wt % B. Preferred B-to-A ratios range from 20% to 80 wt % B to A. Above the minimum B ratio, the resulting material behaves as a blend of A and B. The material has the low permeability of a thermoplastic polymer and the moisture resistance and flexibility of a rubber.

The IPMS composition may of course include various compounding agents normally blended into rubber compositions in addition to the IPMS such as carbon black, white carbon, and other reinforcing agents, softening agents, plasticizers, antioxidants, processing aids, pigments, dyes, and other coloring agents, but the content of the IPMS in the IPMS composition is preferably 99.5 to 20 wt % or so, in particular, 98 to 25 wt % or so. In general see U.S. Pat. No. 5,910,544, the disclosure of which is incorporated by reference.

More particularly, the composition of the invention may also include one or more filler components such as calcium carbonate, mica, silica and silicates, talc, titanium dioxide, and carbon black. In one embodiment, the filler is carbon black or modified carbon black. The preferred filler is semi-reinforcing grade carbon black present at a level of from 0.1 to 40 wt % of the composition, more preferably from 3 to 30 wt %. Useful grades of carbon black as described in RUBBER TECHNOLOGY 59–85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbamate) and other dithiocarbamates, Tetrone A (dipentamethylene thiuram hexasulfide), Vultac-5 (alkylated phenol disulfide), SP1045 (phenol formaldehyde resin), SP1056 (brominated alkyl phenol formaldehyde resin), DPPD. (Diphenyl phenylene diamine), salicyclic acid (o-hydroxy benzoic acid), wood rosin (abietic acid), and TMTDS (tetramethyl thiuram disulfide) in combination with sulfur. These and other curing agents and accelerants are disclosed in the *Rubber World Magazine's* BLUE BOOK 15–123 (Lippincott & Peto 1992). The composition may also be cured using ultraviolet light or electron irradiation.

The compositions of the invention may also contain other conventional additives such as dyes, pigments, antioxidants, heat and light stabilizers, plasticizers, oils, compatibilizers and other ingredients as known in the art.

Blending of the components may be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the filler and other components to intercalate, exfoliate or otherwise thoroughly mix and become uniformly dispersed within the polymer.

Once the desired thermoplastic vulcanizate composition is prepared, a corresponding oriented film can be prepared. Orienting the film promotes lower permeability and/or higher flexibility over the non-oriented film. At this point in the process, the thermoplastic vulcanizate is processed into an oriented film in which thermoplastic polymer molecules are substantially oriented in one or two dimensions. Orienting the film is accomplished by stressing the film along at least one direction usually by stretching the film in at least one stretch direction. It is within the scope of this invention to stretch in more than one direction. Typical processes are the tubular process, tentor process, or bubble process, and are known to those skilled in the art, and the invention is not herein limited to the method of orienting the film formed from the composition of the invention. Methods of making films, film materials, and test methods are disclosed in 9 KIRK-OTHMER ENCYCLOPEDIA OF CHEMICAL TECHNOLOGY 220–244 (John Wiley & Sons 1966). In one embodiment, the film is oriented in one direction, and in another embodiment the film is oriented in two directions, or biaxially oriented.

Once the film is first formed and oriented, the oriented film is heatset. This retains the anisotropic alignment of polymer molecules after the film has cooled. Heatsetting is carried out at between the melting point of the thermoplastic, $T_m$, and $T_m-100°$ C. Heatsetting methods as are normally practiced in the art are useful in the practice of this invention. After orientation, the material is cooled to freeze or set the polymer orientation into place.

Orientation can be measured by heating the oriented thermoplastic vulcanizate film. When heated, the oriented polymer molecules relax, causing the film to shrink along the stretch direction or directions. The thermoplastic polymer molecules are considered to be substantially oriented if the resulting film shows shrinkage greater than or equal to 5% along the stretch directions when the film is so heated.

Stressing can occur by casting the film followed by stretching it on rollers or by blow molding the film with appropriate elongation. The goal is to pull the film so that its length along a stretch direction increases by about 110 to 800%. Methods for processing and stretching film are known in the art. The film's temperature during the stretching process should be between about the thermoplastic polymer's glass transition temperature, $T_g$, and about $T_g+50°$ C.

Embodiments of the final composition of the present invention are useful as air barriers, such as used in producing innerliners for motor vehicles. In particular, the films made by the method of the invention are useful in innerliners in articles such as truck tires, bus tires, passenger automobile, motorcycle tires, off the road tires, and the like. The improved heat aging resistance of the present innerliner composition makes it particularly suited for use in truck tires to increase the retreading capability of the tire.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A process for preparing a thermoplastic vulcanizate film, containing at least one polyamide and at least one vulcanizable polymer, comprising:
   (a) heating the thermoplastic vulcanizate;
   (b) stretching the thermoplastic vulcanizate in at least one stretch direction causing an anisotropic arrangement of the polyamide; and
   (c) heatsetting the polyamide to lock in the anisotropic arrangement of the polyamide; and
   (d) cooling the thermoplastic vulcanizate.

2. The process of claim 1, wherein stretching comprises increasing the length of the thermoplastic vulcanizate along the stretch direction between about 110% and 800%.

3. The process of claim 1, wherein cooling comprises lowering the temperature of the thermoplastic vulcanizate to below its glass transition temperature.

4. The process of claim 1, wherein the polyamide is selected from the group consisting of nylon 6, nylon 66, nylon 11, nylon 12, a nylon 6 and nylon 66 blend (N6/N66), a nylon 6 and nylon 11 blend (N6/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 12 blend (N11/N12), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612), and mixtures thereof.

5. The process of claim 1, wherein the vulcanizable polymer is a brominated poly(isobutylene-co-paramethylstyrene).

6. The process of claim 1, also comprising a filler.

7. An innerliner formed by the process of claim 1.

8. A process for preparing a thermoplastic vulcanizate film comprising:
   (a) heating a thermoplastic vulcanizate comprising at least one brominated poly(isobutylene-co-paramethylstyrene) and at least one polyamide;
   (b) stretching the thermoplastic vulcanizate in at least one stretch direction causing an anisotropic arrangement of the polyamide; and
   (d) cooling the thermoplastic vulcanizate.

9. The process of claim 8, wherein stretching comprises increasing the length of the thermoplastic vulcanizate along the stretch direction between about 110% and 800%.

10. The process of claim 8, wherein cooling comprises lowering the temperature of the thermoplastic vulcanizate to below its glass transition temperature.

11. The process of claim 8, wherein the polyamide is selected from the group consisting of nylon 6, nylon 66, nylon 11, nylon 12, a nylon 6 and nylon 66 blend (N6/N66), a nylon 6 and nylon 11 blend (N6/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 12 blend (N11/N12), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612), and mixtures thereof.

12. The process of claim 11, wherein the polyamide is selected from the group consisting of nylon 6, nylon 66 and mixtures thereof.

13. The process of claim 8, also comprising a filler.

14. An innerliner made by the process of claim 8.

15. An oriented thermoplastic vulcanizate film prepared by:
   (a) heating a thermoplastic vulcanizate, comprising at least one brominated poly(isobutylene-co-paramethylstyrene) vulcanizable polymer and at least one thermoplastic polyamide, to a temperature above the glass transition temperature of the polyamide;
   (b) stretching the thermoplastic vulcanizate in at least one stretch direction so that the length of the vulcanizate increases by about 110% to 800% causing an anisotropic arrangement of the polyamide; and
   (c) heatsetting the polyamide to lock in its orientation; and
   (d) cooling the thermoplastic vulcanizate to below the glass transition temperature of the polyamide.

16. An oriented thermoplastic film prepared by:
   (a) heating a thermoplastic vulcanizate, comprising at least one brominated poly(isobutylene-co-paramethylstyrene) vulcanized polymer and at least one thermoplastic polyamide, to a temperature above the glass transition temperature of the polyamide;
   (b) stretching the thermoplastic vulcanizate in at least one stretch direction so that the length of the vulcanizate increases by about 110% to 800% causing an anisotropic arrangement of the polyamide; and
   (c) heatsetting the polyamide to lock in its orientation; and
   (e) cooling the thermoplastic vulcanizate to below the glass transition temperature of the polyamide.

* * * * *